H. C. RICHERT.
AUTOMOBILE TOP.
APPLICATION FILED AUG. 26, 1915.
1,200,239.
Patented Oct. 3, 1916.
2 SHEETS—SHEET 1.
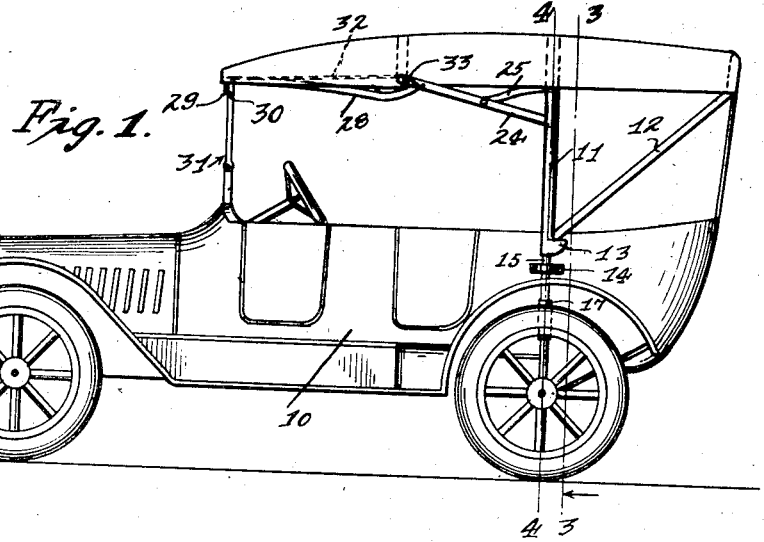
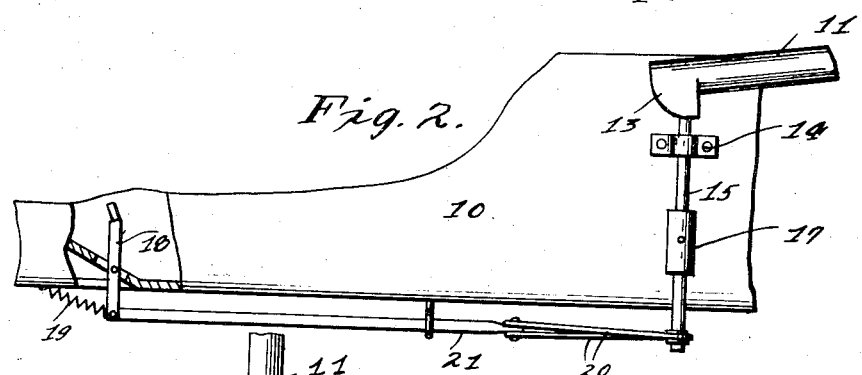
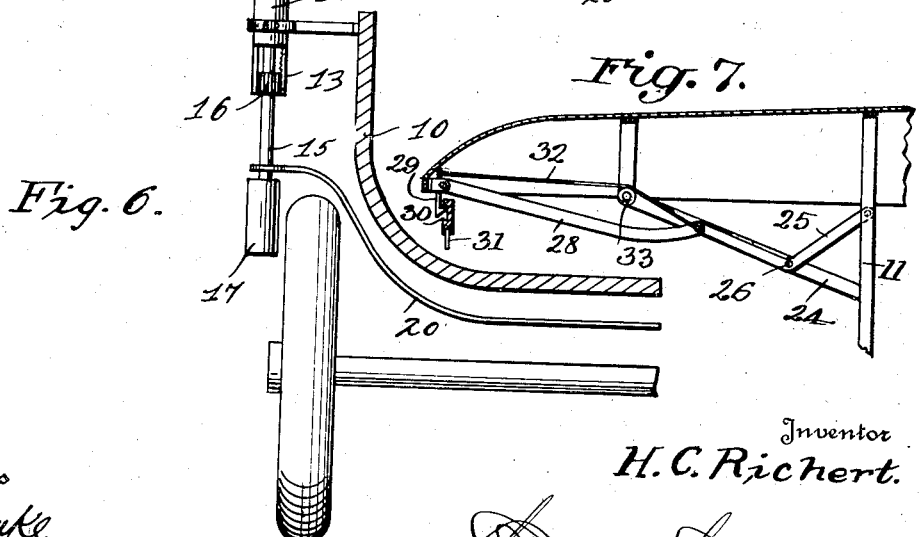
Witnesses
Inventor
H. C. Richert.
By
Attorneys.

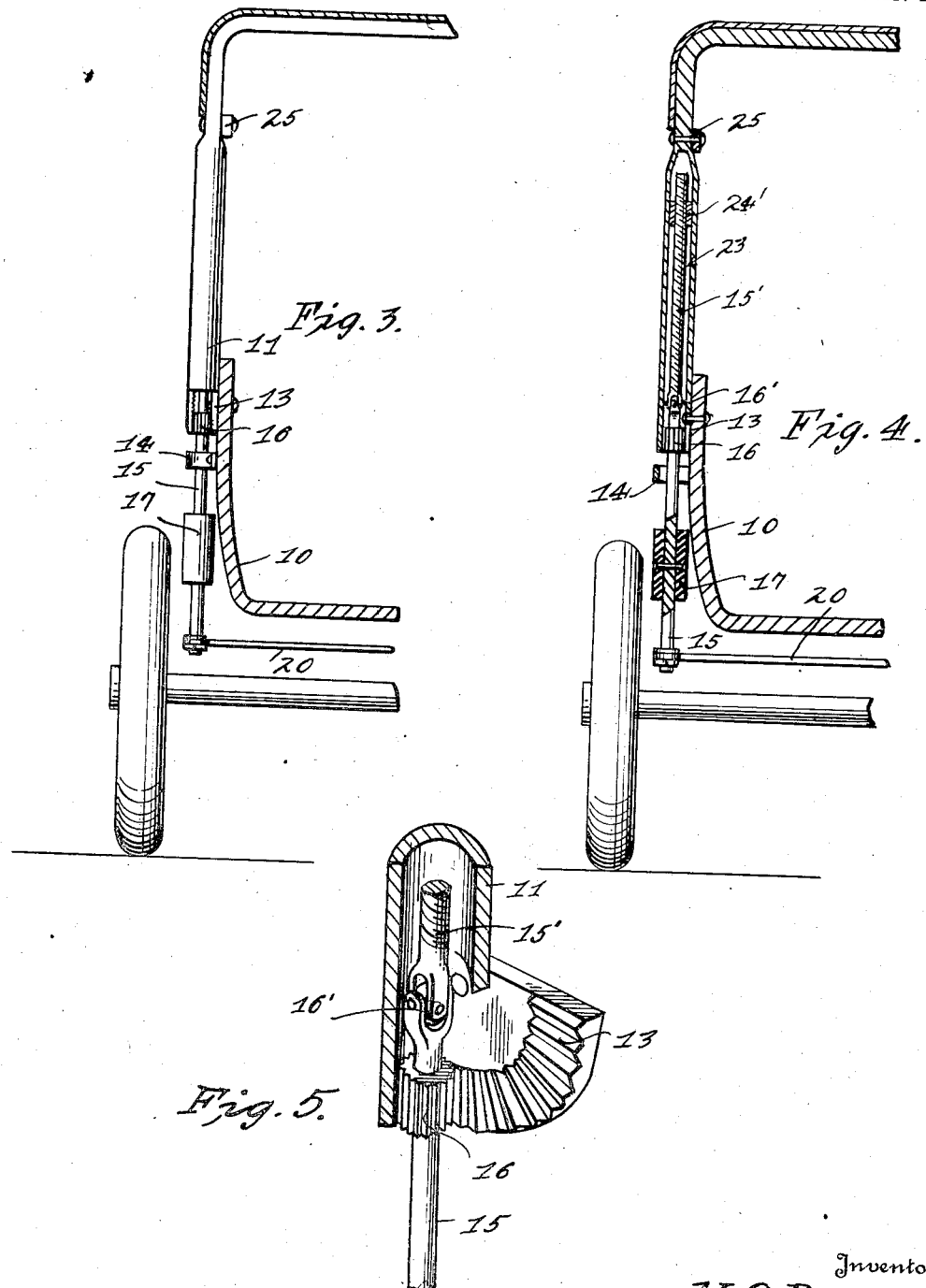

UNITED STATES PATENT OFFICE.

HERMAN C. RICHERT, OF DES PLAINES, ILLINOIS.

AUTOMOBILE-TOP.

1,200,239.

Specification of Letters Patent.   Patented Oct. 3, 1916.

Application filed August 26, 1915.  Serial No. 47,467.

*To all whom it may concern:*

Be it known that I, HERMAN C. RICHERT, a citizen of the United States, residing at Des Plaines, in the county of Cook, State of Illinois, have invented certain new and useful Improvements in Automobile-Tops; and I do hereby declare the following to be a full, clear, and exact description of the invention, such as will enable others skilled in the art to which it appertains to make and use the same.

This invention relates to improvements in automobile tops.

The principal object of the invention is to provide a novel and efficient mechanism for lifting and spreading the top and for lowering and folding the same.

Another object is to provide a novel mechanism which can be thrown into operation by the operator from his seat and by means of which the top can be raised or lowered by the forward or rearward movement of the automobile.

Other objects and advantages will be apparent from the following description when taken in connection with the accompanying drawing.

In the drawing: Figure 1 is a side elevation of an automobile having my improved top and raising and lowering mechanism, the top being shown in elevated position, Fig. 2 is a side elevation showing the top in folded position, part of the body of the automobile being broken away to show the foot lever, Fig. 3 is a vertical section on the line 3—3 of Fig. 1, Fig. 4 is a vertical section on the line 4—4 of Fig. 1, Fig. 5 is a perspective view of one of the pivotal connections of the rear bow, and Fig. 6 is a vertical transverse section through an automobile showing a modification of the device. Fig. 7 is a vertical longitudinal section through the top.

Referring particularly to the accompanying drawing, 10 represents the body of the automobile to which the bows 11 and 12 are pivotally connected. Formed on the lower or pivotal end of each side of the bow 11 is a toothed segment 13. Mounted to swing in brackets 14 on the sides of the body are the vertical shafts 15, on the upper end of each of which is a pinion 16 meshing with one of the toothed segments 13. Carried by this shaft 15 is a sleeve 17 which is adapted to engage with the side of the tire of the wheel to rotate the said shaft. Pivotally mounted in the forward part of the floor of the body is a vertical foot lever 18, the lower end of which is connected to a point forwardly thereof by a spring 19 which normally holds the lever in a vertical position. Loosely connected to the lower end of each of the shafts 15 is a forwardly and inwardly extending link 20, the forward ends of which are pivotally connected together and to the rear end of a rod 21 pivotally connected to the lower end of the foot lever 18. The shaft 15 is connected to the lower end of a vertical threaded shaft 15' mounted in the side member of the bow 11 by means of a universal joint 16'. Extending longitudinally of each side member of the bow 11 is a slot 23 through which projects the forwardly extending arms of the bow 24. The rear ends of the arms of the bow 24 are formed with internally threaded heads 24' which receive the threaded shafts 15' therethrough. Pivotally connected to the upper portion of each side of the bow 11 is a forwardly extending angular arm 25, the angle of which is pivotally connected to the inner end portion of the bow 24, as at 26. Pivotally connected to the forward side portions of the arms 25 are the rear ends of the sides of the bow 28. There is a slight downward curve of the sides of the bow 28, from its point of connection with the arms 25, so that the portion of the bow 25 forwardly of the pivot 26 will engage the sides of the bow 28 to push the same forward when the top is being moved from folded position. Carried by the forward end of the bow 28 are the latch members 29 which engage in notches 30 of the wind shield 31.

Secured to the arms 25, at points where they are pivoted to the bow 28, are straps 32, said straps passing over rollers 33 carried by the forward portion of the bow 24, and at the sides thereof. The forward ends of the straps are secured to the pivoted latches 29, which are mounted on the forward part of the bow 28, and adapted to engage in the notches 30, formed in the upper part of the windshield 34. Assuming the top to be down in folded position and it is desired to raise the same, the operator drives his car forward and while the car is in motion presses his foot against the lever 18. This causes the rearward movement of the rod 21 and the spreading movement of the links 20, which in turn rock the shafts 15 so that the sleeves 17 engage the sides of the tires of the rear wheels and the pinions 16 engage with the toothed segments 13. The shafts 15 will then be caused to rotate transmitting motion to the bow 11 to raise the same to an upright position.

The rotation of the pinion 16 causes the screw shaft 15' to be rotated with the consequent raising of the bow 24, and through the arms 25, the lowering of the bow 28 until the latches 29 engage in the notches of the windshield.

To fold the top the automobile is driven backwardly and then the foot lever 18 pressed, as before. All of the parts will thus move in an opposite direction to that before-described. During this reversal of movement of the parts, however, the rollered end of the bow 24 presses upwardly against the tapes so that the bow 28 is swung upwardly on its pivots and permitted to fall against the bows 11 and 24. The rear ends of the cords being attached to the forward ends of the arms 25, said cords will be pulled rearwardly to rock the latches out of engagement with the notches of the windshield. This is accomplished by the engagement of the rollers 33 with the cords between their points of attachment with the bow 28 and the arms 25. It will thus be seen that when the lower ends of the side portions of the bow 24 move downwardly through the screw shafts, the upper ends of said side portions will swing inwardly toward the bow 11. Thus the rollers draw on the cords and cause the upward swinging movement of the bow 28. In the forward, or opening movement of the top, the bow 28 will fall by its own weight, at which time the cords will become slackened to such an extent as to permit the latches to engage with the notches of the windshield.

What is claimed is:

1. The combination with the body and wheels of an automobile, of a folding top mounted on the body, said top including bows having arcuate toothed portions, brackets carried by the sides of the body, vertical shafts mounted in the brackets for swinging movement toward and away from the wheels of the automobile, and having toothed members engaging the first toothed members, a foot operated pedal, and connections between the vertical shafts and the pedal for moving the said shafts into and out of engagement with the wheels.

2. The combination with the body and wheels of an automobile, of a folding top therefor, said top including a plurality of pivotally mounted bows, certain of the bows having curved toothed portions, screw shafts carried by said bows and operatively engaged with certain other of the bows, vertical rotatable shafts mounted on the sides of the body of the automobile for lateral swinging movement toward and away from the wheels, and operatively connected to the screw shafts, pinions on the vertical shafts engaging with the said toothed portions, a pedal mounted on the floor of the automobile, a rod pivotally connected to the pedal and extending rearwardly, and a pair of links pivotally connected together and to the pedal, at one end, and at their other ends to the lower ends of the said vertical shafts.

In testimony whereof, I affix my signature, in the presence of two witnesses.

HERMAN C. RICHERT.

Witnesses:
JOHN WILLIAM KOENIG,
M. A. BEHRENS.